(12) United States Patent
Inobe

(10) Patent No.: US 9,386,247 B2
(45) Date of Patent: Jul. 5, 2016

(54) IMAGE PROCESSOR

(71) Applicant: Kabushiki Kaisha Toshiba, Minato-Ku, Tokyo (JP)

(72) Inventor: Ryuta Inobe, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 165 days.

(21) Appl. No.: 14/189,195

(22) Filed: Feb. 25, 2014

(65) Prior Publication Data

US 2015/0015753 A1 Jan. 15, 2015

(30) Foreign Application Priority Data

Jul. 10, 2013 (JP) ................................. 2013-144534

(51) Int. Cl.
*H04N 5/335* (2011.01)
*H04N 3/14* (2006.01)
*H04N 5/372* (2011.01)

(52) U.S. Cl.
CPC ........... *H04N 5/37213* (2013.01); *H04N 5/372* (2013.01)

(58) Field of Classification Search
CPC ........................ H04N 5/37213; H04N 5/372
USPC ................. 348/298, 294, 311, 321, 323, 308; 250/208.1; 327/94
See application file for complete search history.

(56) References Cited

U.S. PATENT DOCUMENTS

| 2009/0213259 A1* | 8/2009 | Su ......................... H04N 5/3575 348/308 |
| 2009/0237120 A1* | 9/2009 | Haraguchi ........... G11C 27/024 327/94 |
| 2012/0001056 A1* | 1/2012 | Fife .................... H01L 27/14632 250/208.1 |
| 2012/0061733 A1* | 3/2012 | Rothberg ............. C12Q 1/6825 257/253 |

FOREIGN PATENT DOCUMENTS

| JP | 11-213687 A | 8/1999 |
| JP | 2000-138548 A | 5/2000 |

* cited by examiner

*Primary Examiner* — Tuan Ho
*Assistant Examiner* — Zhenzhen Wu
(74) *Attorney, Agent, or Firm* — White & Case LLP

(57) ABSTRACT

An aspect of one present embodiment, there is provided a solid state image processor, including a sample-and-hold circuit sampling an output signal of the CCD to hold the output signal of the CCD as voltage, a pre-buffer receiving an output signal of the sample-and-hold circuit, a selection circuit receiving the output signal of the pre-buffer as a first input signal and the output signal of the CCD as a second input signal to select the first input signal or the second input signal as an output signal of the selection circuit according to an instruction of a selection signal, and a main buffer receiving the output signal of the selection circuit.

15 Claims, 7 Drawing Sheets

US 9,386,247 B2

IMAGE PROCESSOR

CROSS REFERENCE TO RELATED APPLICATION

This application is based upon and claims the benefit of priority from prior Japanese Patent Application No. 2013-144534, filed on Jul. 10, 2013, the entire contents of which are incorporated herein by reference.

FIELD

Exemplary embodiments described herein generally relate to an image processor.

BACKGROUND

In an image reader such as a copy machine, a scanner or the like, photoelectric conversion is conducted by an image processor installing a charge coupled device (CCD). Recently, a sample-and-hold circuit is provided in the image processor to stabilize a level of an output signal for corresponding to highly increasing of reading speed of the image reader. In the stabilization, an output signal of the CCD is performed to be held in a sampling process.

In such the situation, a pre-buffer having smaller driving force is provided at a latter part of the sample-and-hold circuit to stabilize the sampling step during higher driving. Accordingly, a constitution of two-step buffer in which a main buffer with larger driving force is driven by the pre-buffer, is provided.

When the copy machine, the scanner or the like using such the image processor is provided as series products, sample-and-hold function may be not necessary dependent on a kind of the products.

In such a case, an output data of the CCD is directly conducted to input into the pre-buffer where the sample-and-hold circuit is set to be usually in the sampling state.

When the pre-buffer is constituted with one conductive-type MOS transistors, the output level is lower than the input level.

A problem is conventionally generated in a case that the sample-and-hold function is not necessary. Namely sensitivity of the image processor is lowered as the signal is passed through the pre-buffer. Further, electrical current consumption due to the pre-buffer is also remained a significant problem.

DETAILED DESCRIPTION

Figure 1:
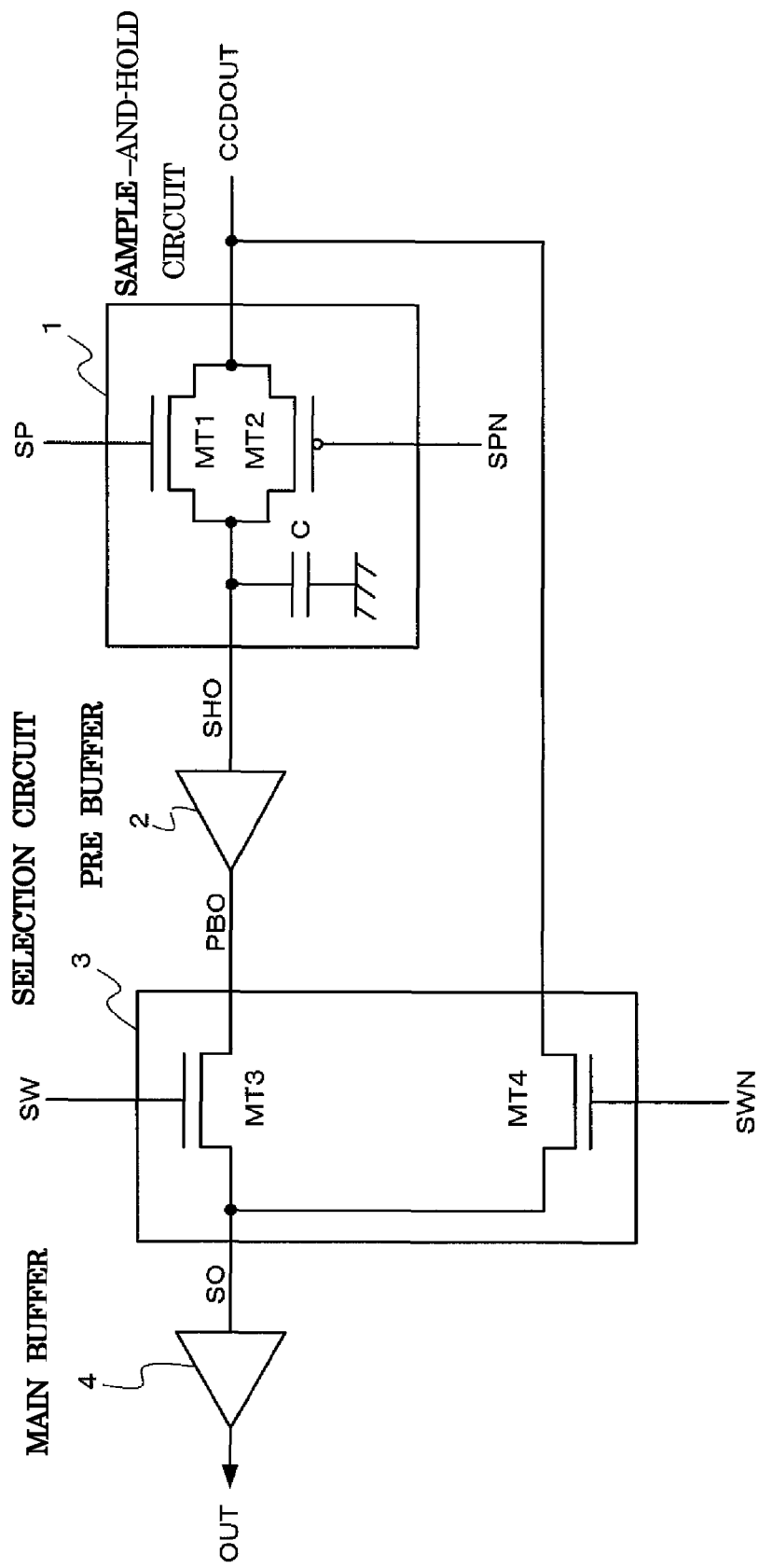
FIG. 1 is a block diagram showing a constitution of an image processor according to a first embodiment.

An aspect of one embodiment, there is provided an image processor, including claim 1.

Embodiments will be described below in detail with reference to the attached drawings mentioned above. Throughout the attached drawings, similar or same reference numerals show similar, equivalent or same components, and the description is not repeated.

First Embodiment

FIG. 1 is a block diagram showing a constitution of an image processor according to a first embodiment.

An image processor according to the first embodiment includes a sample-and-hold circuit 1, a pre-buffer 2, a selection circuit 3 and a main buffer 4. The sample-and-hold circuit 1 performs sampling an output signal CCDOUT of the CCD to hold as a sampling voltage. The pre-buffer 2 receives an output signal SHO from the sample-and-hold circuit 1. The selection circuit 3 receives an output signal SHO of the pre-buffer 2 as a first input signal and an output signal CCDOUT of the CCD as a second input signal to select the first input signal PBO or the second input signal CCDOUT as an output signal according to an instruction of a selection signal SW where an inverse signal SWN is an inversion signal of the selection signal SW. A main buffer 4 receives an output signal SO of the selection circuit 3

The sample-and-hold circuit 1 includes an analog switch and a capacitor C. The analog switch is combined with an n-type MOS transistor MT1 and a p-type MOS transistor MT2. A gate terminal of the n-type MOS transistor MT1 receives the sampling signal SP. A gate terminal of the p-type MOS transistor MT2 receives an inverse sampling signal SPN. The capacitor C is connected to an output terminal of the analog switch.

The output signal CCDOUT of the CCD is passed through the sample-and-hold circuit 1 when the sampling signal SP is 'H' (high level). A level of the output signal CCDOUT of the CCD is held in the sample-and-hold circuit 1 during the level of the sampling signal SP being set to be 'L' (low level) when the sampling signal SP is changed from 'H' to 'L'.

The pre-buffer 2 acts as a middle buffer to transmit the output signal of the sample-and-hold circuit 1 to the main buffer 4. The sample-and-hold circuit 1 has not driving force, as a result, the pre-buffer 2 is provided to drive the main buffer 4.

Figure 2:
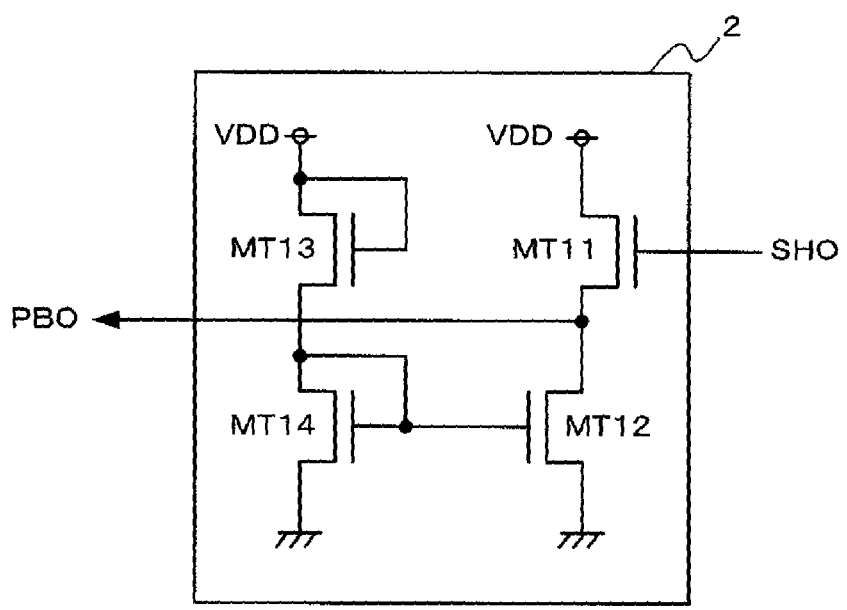
FIG. 2 is a block diagram showing a constitution of a pre-buffer of the image processor according to the first embodiment.

FIG. 2 is a block diagram showing a constitution of a pre-buffer of the image processor, for example, according to the first embodiment. In an example as shown in FIG. 2, the pre-buffer 2 is constituted with n-type MOS transistors MT11-MT14.

The MOS transistor MT11 and the MOS transistor MT12 are formed as a source follower in the pre-buffer 2 as shown in FIG. 2. Bias potential provided to the MOS transistor MT12 is generated by the MOS transistor MT13 and the MOS transistor MT14.

A signal having a same phase as a signal transmitted into a gate terminal of the MOS transistor MT11, constituting the source follower, is transmitted from a drain terminal of the MOS transistor MT11.

On the other hand, an amplitude ratio of the source follower is small than one. Accordingly, a level of the output signal PBO of the pre-buffer 2 is lower than a level of the input signal SHO.

The selection circuit 3 includes an n-type MOS transistor MT3 received a first input signal PBO and an n-type MOS transistor MT4 received a second input signal CCDOUT.

A gate terminal of the MOS transistor MT3 is received the selection signal SW and a gate terminal of the MOS transistor MT4 is received an inverse selection signal SWN.

Accordingly, the MOS transistor MT3 is conducted when the selection signal SW is set to be 'H' and the MOS transistor MT4 is conducted when the selection signal SW is set to be 'L'.

In other words, the selection circuit 3 selects the first signal PBO when the selection signal SW is set to be 'H' and selects the second input signal CCDOUT when the selection signal SW is set to be 'L'. The selection circuit 3 transmits each of the signals as the output signal SO.

The main buffer 4 transmits the output signal SO transmitted from the selection circuit 3 as an output signal OUT to an external portion.

Figure 3:
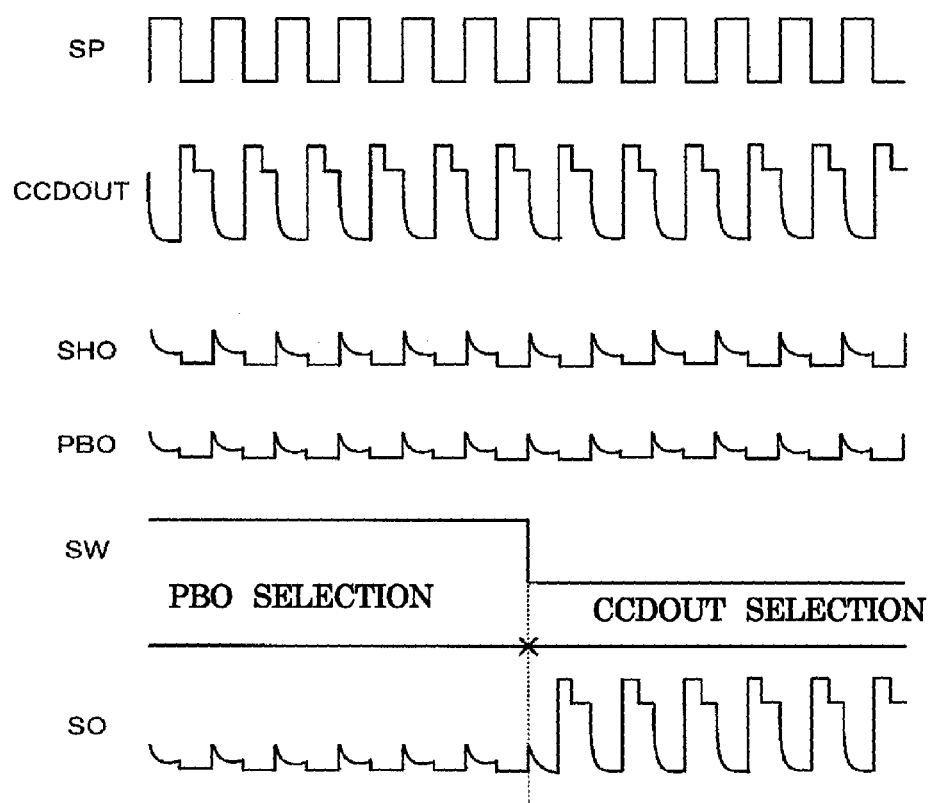
FIG. 3 is a wave form diagram showing an action of the image processor according to the first embodiment.

FIG. 3 is a wave form diagram showing an action of the image processor, for example, according to the first embodiment.

In the image processor according to the first embodiment, when the selection signal SW is set to be 'H' as the output signal SO of the selection circuit 3, the output signal CCDOUT of the CCD is sampled and held in the sample-and-hold circuit 1 so that the output signal PBO is transmitted through the pre-buffer 2. The output signal CCDOUT is directly transmitted when the selection signal SW is set to be 'L'.

When sample-and-hold function is not necessary, the selection signal SW is set to be 'L'. In such a manner, the output signal CCDOUT of the CCD can be directly transmitted as the output signal SO of the selection circuit 3. In such the case, the output signal SO is not influenced by level lowering due to the pre-buffer 2, as being not passed through the pre-buffer 2.

The selection signal SW of the selection circuit 3 is set to be 'L' to be able to directly transmit the output signal CCDOUT of the CCD without passing through the pre-buffer 2 when the sample-and-hold function is not necessary according to the first embodiment.

In such a manner, the level lowering due to the pre-buffer 2 can be suppressed to block sensitivity lowering when the sample-and-hold circuit is not utilized.

Second Embodiment

In the image processor according to the first embodiment, the sample-and-hold circuit 1 is operated when sample-and-hold function is not necessary. In a second embodiment, action of the sample-and-hold circuit 1 can be aborted in an image processor when the sample-and-hold function is not necessary, for example.

Figure 4:
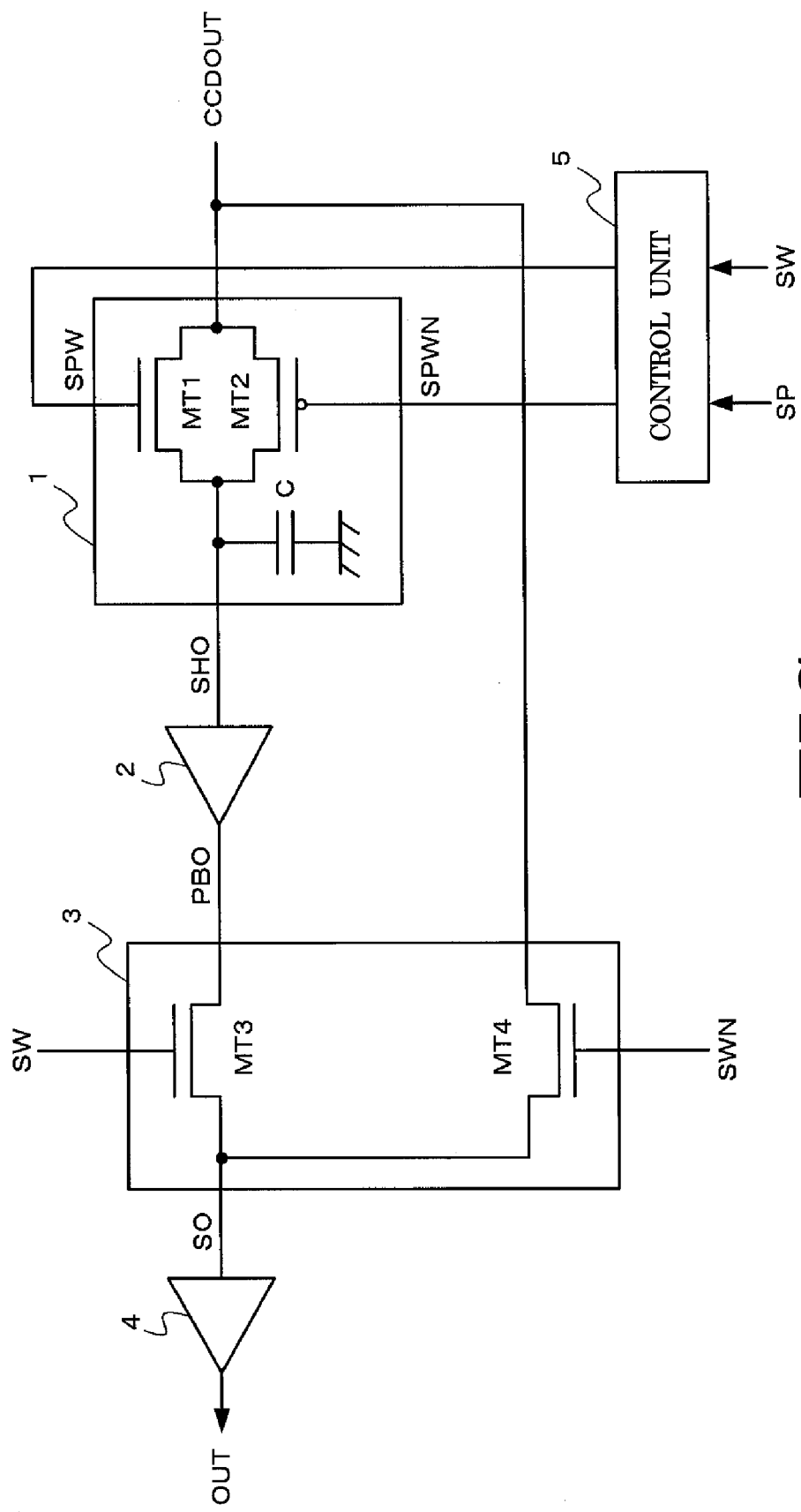
FIG. 4 is a block diagram showing a constitution of an image processor according to a second embodiment.

FIG. 4 is a block diagram showing a constitution of an image processor, for example, according to the second embodiment.

In the image processor according to the second embodiment, a sampling abort control unit 5 is added to the image processor according to the first embodiment.

The sampling abort control unit 5 is received the sampling signal SP and the selection signal SW as an input signals to transmit a sampling signal SPW and an inverse sampling signal SPWN which are generated therein.

In the second embodiment, the sampling signal SPW is inputted into the gate terminal of the MOS transistor MT1 of a sample-and-hold circuit 1, and the inverse sampling signal SPWN is inputted into the gate terminal of the MOS transistor MT2 of the sample-and-hold circuit 1.

Figure 5A:
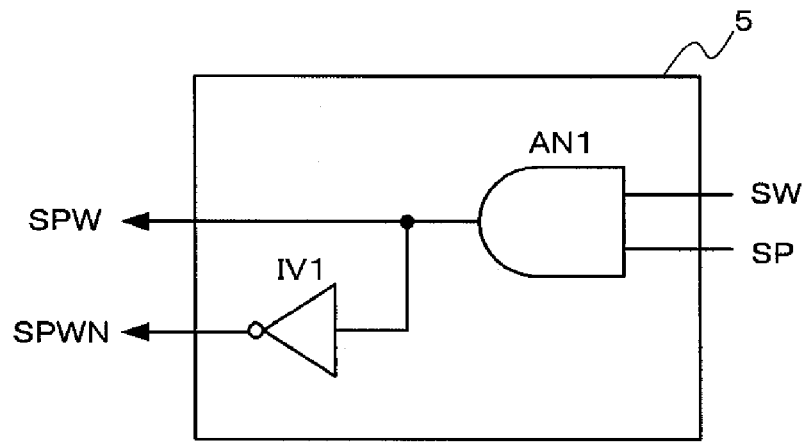
FIG. 5A is a block diagram showing a constitution of a sampling abort control unit of the image processor according to the second embodiment.

FIG. 5A is a block diagram showing a constitution of the sampling abort control unit 5 in the image processor, for example, according to the second embodiment.

The sampling abort control unit 5 includes an AND gate AN1 and an inverter IV1. The AND gate AN1 is received the sampling signal SP and the selection signal SW. The inverter IV1 inverses an output signal of the AND gate AN1.

The output signal of the AND gate 1 is transmitted as the sampling signal SPW. The output signal of the inverter IV1 is transmitted as the inverse sampling signal SPWN.

Figure 5B:
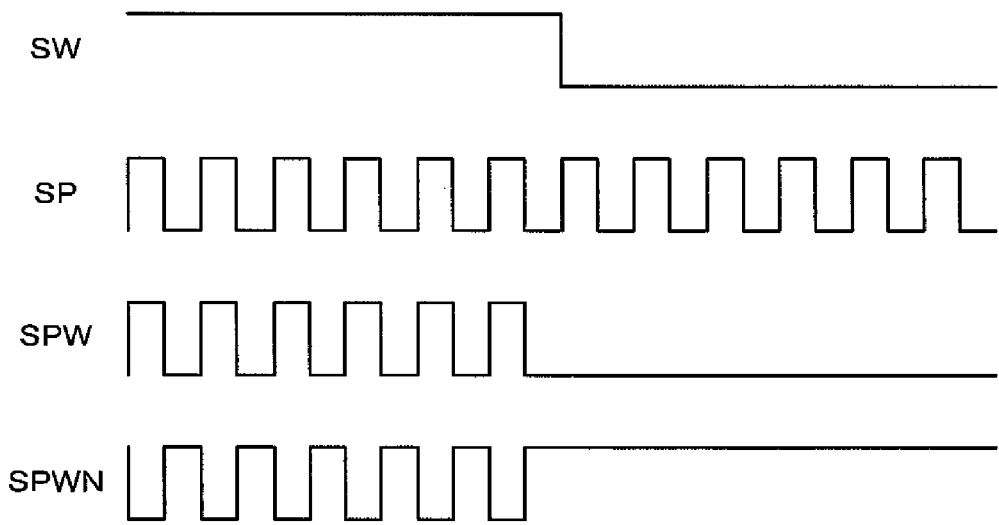
FIG. 5B is a wave form diagram showing the sampling abort control unit of an action of the image processor according to the second embodiment.

FIG. 5B is a wave form diagram showing an action of the sample abort control unit 5 of the image processor, for example, according to the second embodiment The sampling signal SPW is the same as the sampling signal SP when the signal selection signal SW is set to be 'H'. On the other hand, the sampling signal SPW is fixed to be 'L' level when the selection signal SW is set to be 'L'.

The inverse sampling signal SPWN is an inverse signal of the sampling signal SP when the selection signal SW is set to be 'H'. On the other hand, the inverse sampling signal SPWN is fixed to the 'H' level when the selection signal SW is 'L'.

Accordingly, the sampling signal SPW is fixed to the 'L' level and the inverse sampling signal SPWN is fixed to the 'H' level, when the selection signal SW is set to be 'L' not to be necessary with respect to the sample-and-hold function.

Therefore, the MOS transistor MT1 and the MOS transistor MT2 in the sample-and-hold circuit 1 are not conducted in a period of the selection signal SW being set to be 'L'. Accordingly, the sample-and-hold circuit 1 is aborted the sampling action.

The sampling action of the sample-and-hold circuit 1 can be aborted when the sample-and-hold function is not necessary according to the second embodiment. In such a manner, electrical current consumption with respect to the sampling of the sample-and-hold circuit 1 can be reduced.

Third Embodiment

In the image processor according to the first and second embodiments, electrical current flows in the pre-buffer 2 in a case that the sample-and-hold function is not necessary. In a third embodiment, electrical current flowed in the pre-buffer 2 can be cut off as the image processor when the sample-and-hold function is not necessary.

Figure 6:
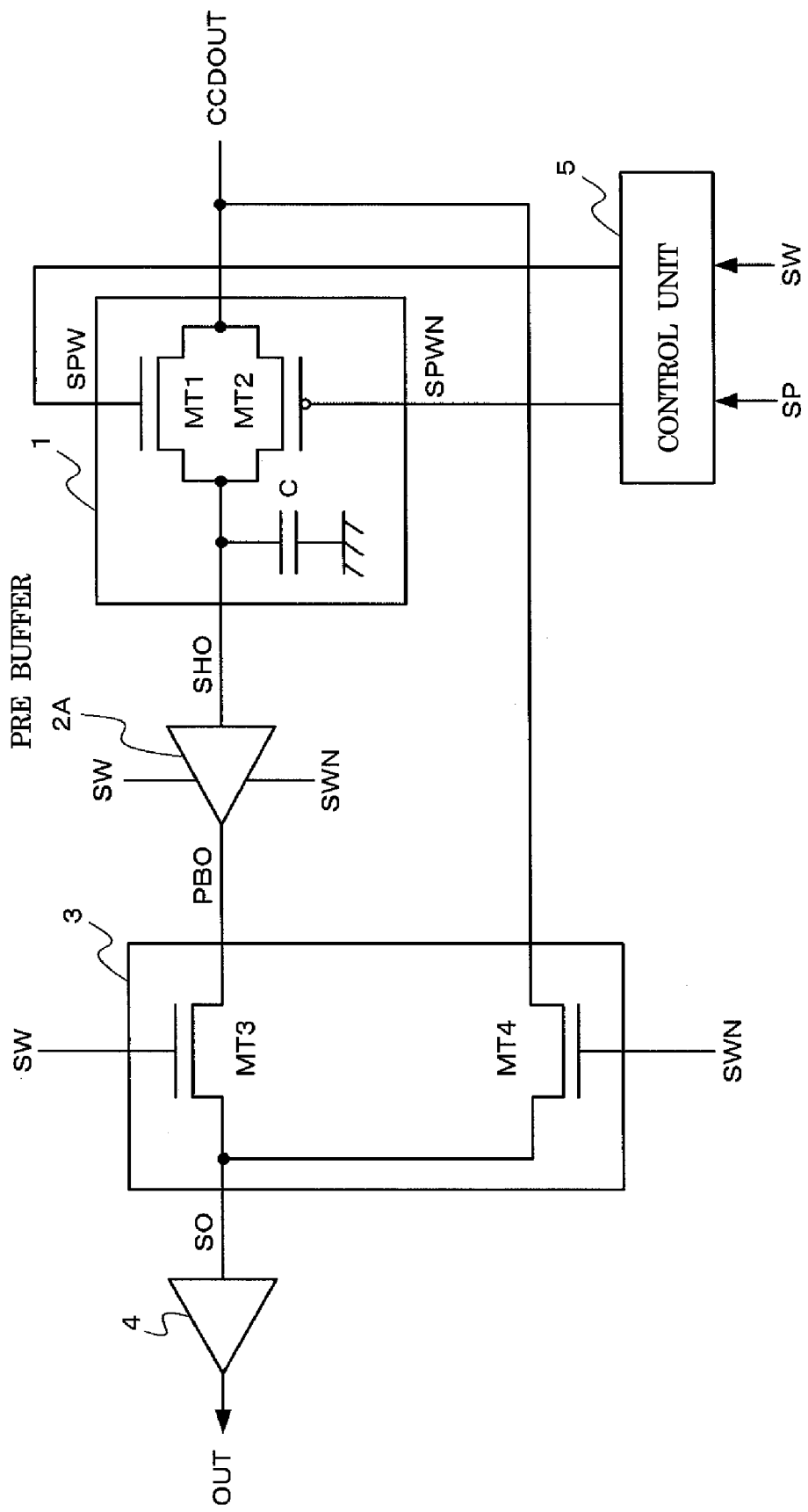
FIG. 6 is a block diagram showing a constitution of the image processor according to a third embodiment.

FIG. 6 is a block diagram showing a constitution of an image processor, for example according to the third embodiment.

In the image processor according to the third embodiment, the pre-buffer 2 of the image processor according to the second embodiment is exchange to a pre-buffer 2A having current path interception function.

The pre-buffer 2A has a function including exchanging function between conducting and cutting off on an electrical current path corresponding to the selection signal SW.

Figure 7:
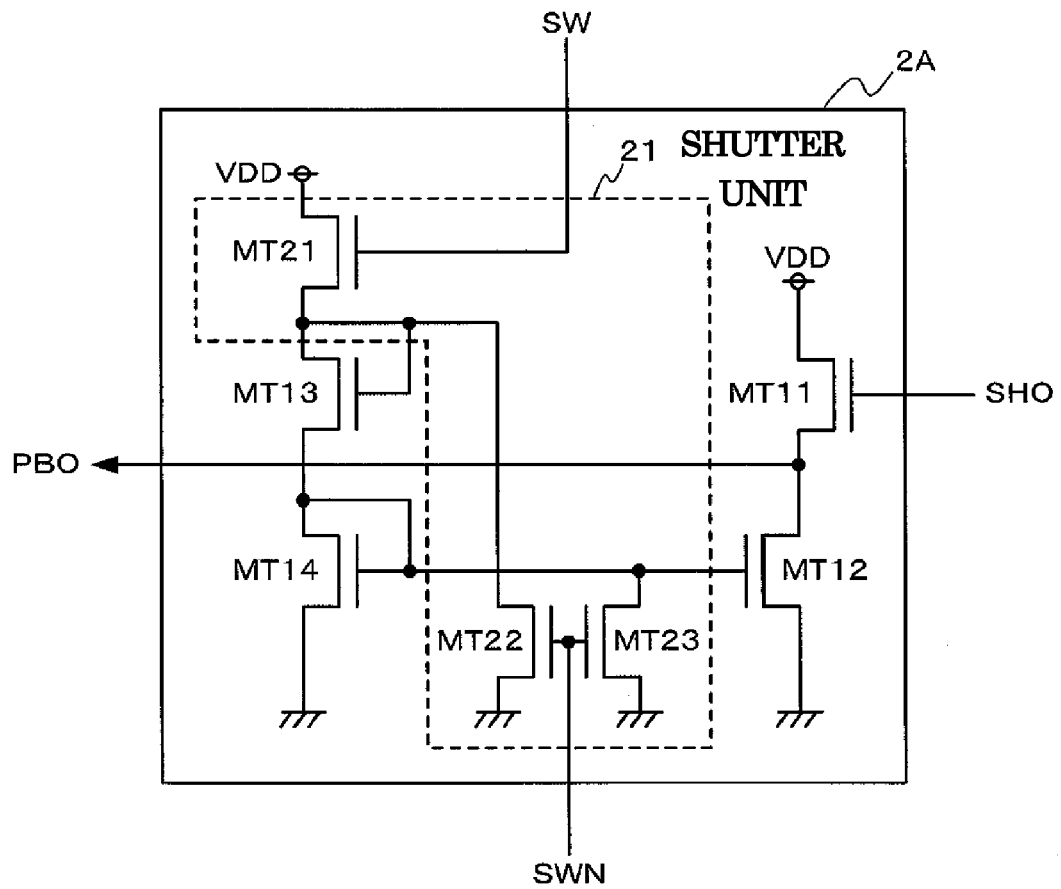
FIG. 7 is a block diagram showing a constitution of a constitution of a pre-buffer of the image processor according to the third embodiment.

FIG. 7 is a block diagram showing a constitution of the pre-buffer 2A of the image processor, for example, according to the third embodiment.

The current path interception unit 21 in the pre-buffer 2A is added to the pre-buffer 2 of the circuit as shown in FIG. 2.

The current path interception unit 21 includes n-type MOS transistors MT21, MT22, MT23.

The MOS transistor MT21 is inserted between a power supply terminal VDD and the MOS transistor MT13 and a gate terminal of the MOS transistor MT21 is received the selection signal SW. The MOS transistor MT21 is set to be off when the selection signal SW is set to be 'L' to cut off the electrical current path between the power supply terminal VDD and the MOS transistor MT13.

Each of the source terminals of the MOS transistors MT22, MT23 is connected to the earth terminal and the inverse selection signal SWN is received in each of the gate terminals. A drain terminal of the MOS transistor MT22 is connected to the gate terminal of the MOS transistor MT13 and a drain terminal of the MOS transistor MT23 is connected to each of the gate terminals of the MOS transistors MT14, MT12.

Accordingly, when the selection signal SW is set to be 'L', namely, the inverse selection signal SWN is set to be 'H', each of the MOS transistors MT22, MT23 is set to be on so that a gate potential of each gate terminal of the MOS transistors MT13, MT14, MT12 is set to be the earth potential. In such a manner, each of the MOS transistors MT13, MT14, MT12 is set to be off so that each of the electrical current paths is cut off.

Namely, all of the electrical current paths in the pre-buffer 2A are cut off, when the selection signal SW is set to be 'L' so that the sample-hold function is not necessary.

The electrical current paths in the pre-buffer 2A can be cut off when the sample-hold function is not necessary according to the third embodiment. In such a manner, electrical current consumption of the pre-buffer 2A can be reduced.

As described above, sensitivity lowering of the sample-and-hold circuit in non-use can be suppressed and electrical current consumption can be reduced, according to at least one of the embodiments of the image processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid state image processing device, comprising:
a sample-and-hold circuit sampling an output signal of the CCD to hold the output signal of the CCD as voltage;
a pre-buffer receiving an output signal of the sample-and-hold circuit;
a selection circuit receiving the output signal of the pre-buffer as a first input signal and the output signal of the CCD as a second input signal to select the first input signal or the second input signal as an output signal of the selection circuit according to an instruction of a selection signal; and
a main buffer received the output signal of the selection circuit.

2. The solid state image processing device of claim 1, wherein
the sample-and-hold circuit includes an analog switch and a capacitor connected to an output terminal of the analog switch.

3. The solid state image processing device of claim 2, wherein
the analog switch includes a first transistor and a second transistor having a reverse conductive type to the conductive type of the first transistor.

4. The solid state image processing device of claim 1, wherein
a first sampling signal and an inverse first sampling signal are inputted into the sample-and-hold circuit.

5. The solid state image processing device of claim 4, wherein
the first sampling signal and the inverse first sampling signal are inputted into the first transistor and the second transistor, respectively.

6. The solid state image processing device of claim 1, wherein
the pre-buffer includes a plurality of transistors, each of the transistors has a same conductive type.

7. The solid state image processing device of claim 1, wherein
the selection circuit includes a third transistor and a fourth transistor which has a same conductive type of the third transistor.

8. The solid state image processing device of claim 7, wherein
the selection signal and an inverse selection signal are inputted into the third transistor and the fourth transistor.

9. The solid state image processing device of claim 1, further comprising:
a sampling abort control unit controlling to abort the sample-and-hold circuit.

10. The solid state image processing device of claim 9, wherein
the sampling abort control unit aborts the sampling of the sample-and-hold circuit when the selection signal instructs the selection of the second input signal.

11. The solid state image processing device of claim 9, wherein
the first sampling signal and the selection signal are inputted into the sampling abort control unit, the sampling abort control unit generates a second sampling signal and an inverse second sampling signal to be outputted to the sample-and-hold circuit.

12. The solid state image processing device of claim 9, wherein
the sampling abort control unit includes an AND gate and an inverter to inverse an output signal of the AND gate.

13. The solid state image processing device of claim 12, wherein
the first sampling signal and the selection signal inputted into the AND gate, and the AND gate and the inverter generate the second sampling signal and the inverse second sampling signal, respectively, to transmit to the sample-and-hold circuit.

14. The solid state image processing device of claim 1, wherein
the pre-buffer includes a current path interception unit which cuts off an electrical current path in the pre-buffer.

15. The solid state image processing device of claim 14, wherein
the current path interception unit cut off the electrical current path when the selection signal instructs the selection of the second input signal.

* * * * *